United States Patent [19]
Ikeda

[11] Patent Number: 4,722,069
[45] Date of Patent: Jan. 26, 1988

[54] NONRESTORING DIVIDER

[75] Inventor: Masayuki Ikeda, Kawasaki, Japan

[73] Assignee: Fujitsu Limited, Kawasaki, Japan

[21] Appl. No.: 719,014

[22] Filed: Apr. 2, 1985

[30] Foreign Application Priority Data

Apr. 9, 1984 [JP] Japan ................................ 59-070353
Jun. 22, 1984 [JP] Japan ................................ 59-128610

[51] Int. Cl.$^4$ ............................................... G06F 7/52
[52] U.S. Cl. ..................................................... 364/767
[58] Field of Search ........................................ 364/767

[56] References Cited

U.S. PATENT DOCUMENTS 3,852,581 12/1974 Reynard ............................. 364/767
4,320,464 3/1982 Desmonds ......................... 364/767

OTHER PUBLICATIONS

Saltman, "Reducing Computing Time for Synchronous Binary Division", *IRE Trans. on Electronic Computers*, Jun. 1961, pp. 169-174.
Kai Hwang; Computer Arithmetic, Chapter 7, ©1979, by John Wiley & Sons, Inc.

*Primary Examiner*—David M. Malzahn
*Attorney, Agent, or Firm*—Staas & Halsey

[57] ABSTRACT

A divider apparatus includes a divisor register for storing a divisor, a partial remainder register for storing a dividend or a partial remainder, a predictor for predicting a partial quotient, a multiplier for multiplying the content of the divisor register, and a first adder for subtracting the output of the multiplier from the content of the partial remainder register and for calculating the partial remainder. The divider apparatus further includes a second adder for determining the difference between the upper digits of the multiplier and the upper digits of the partial remainder register, a first predictor for predicting the partial quotient from the output of the first adder and the upper digits of the divisor register, a second predictor for predicting the partial quotient in the third cycle from a corrected output of the second adder and the digits of the divisor register, a carry predictor for determining the carry to be propagated to the second adder from remaining digits of the multiplier and remaining digits of the partial remainder register, and a selector for selecting one of outputs of the first predicting circuit and the second predictor in dependence upon the output of the carry predictor.

13 Claims, 11 Drawing Figures

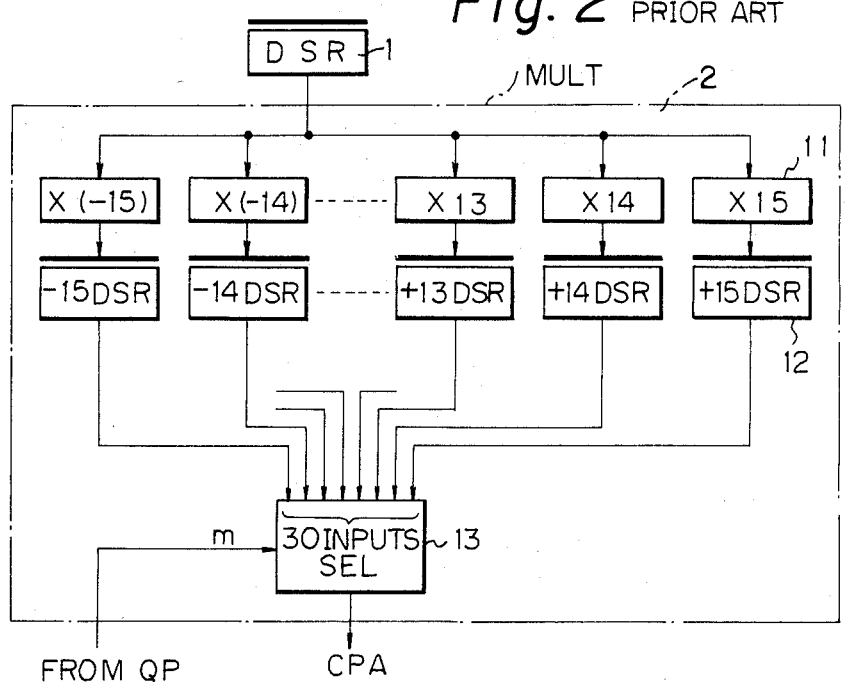
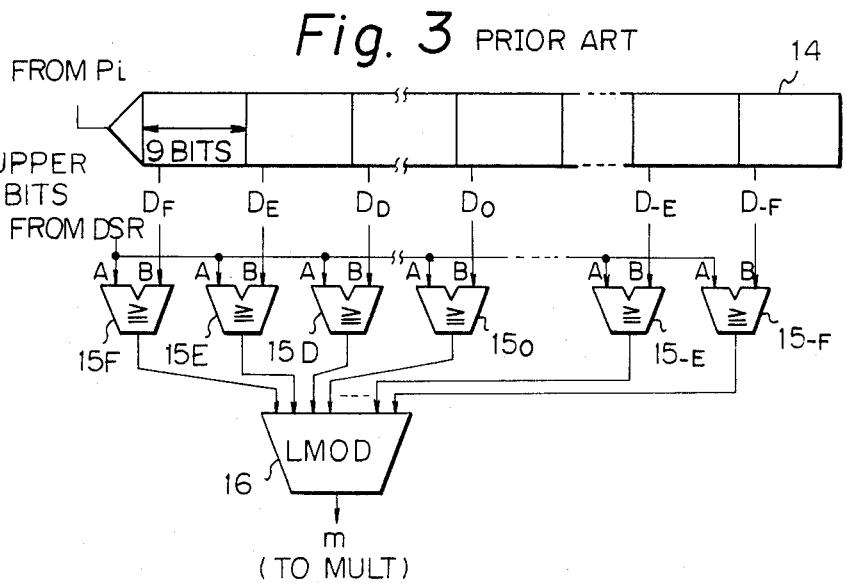

Fig. 4

| CPAO \ m | −15 | −14 | −13 | +14 | +15 |
|---|---|---|---|---|---|
| −32 | L-32,-15 | L-32,-14 | L-32,-13 | L-32,14 | L-32,15 |
| −31 | L-31,-15 | L-31,-14 | L-31,-13 | | |
| −30 | L-30,-15 | L-30,-14 | L-30,-13 | | |
| −29 | L-29,-15 | L-29,-14 | L-29,-13 | | |
| −28 | | | | | |
| −3 | L-3,-15 | L-3,-14 | L-3,-13 | | |
| −2 | | | | | |
| −1 | | | | | |
| 0 | | | | | |
| +1 | | | | | |
| +2 | | | | | |
| +29 | | | | | |
| +30 | | | | | |
| +31 | L31,-15 | L31,-14 | L31,-13 | L31,14 | L31,15 |

Fig. 7

| mL\PL | F | E | D | C | B | A | 9 | 8 | 7 | 6 | 5 | 4 | 3 | 2 | 1 | 0 |
|---|---|---|---|---|---|---|---|---|---|---|---|---|---|---|---|---|
| 00 | | | | | | | | | | | | | | | | 100 |
| 01 | | | | | | | | | | | | | | | 100 | |
| 02 | | | | | | | | | | | | | | 100 | | |
| 03 | | | | | | | | | | | | | 100 | 180 | | |
| 04 | | | | | | | | | | | | 100 | 150 | | | |
| 05 | | | | | | | | | | | 100 | 140 | 1A0 | | | |
| 06 | | | | | | | | | | 100 | 130 | 180 | | | | |
| 07 | | | | | | | | | 100 | 128 | 160 | 100 | | | | |
| 08 | | | | | | | | 100 | 124 | 150 | 190 | | | | | |
| 09 | | | | | | | 100 | 120 | 148 | 180 | 1C0 | | | | | |
| 0A | | | | | | 100 | 11C | 140 | 168 | 1A0 | | | | | | |
| 0B | | | | | 100 | 118 | 138 | [160] | 190 | 1C0 | | | | | | |
| 0C | | | | 100 | 116 | 130 | 150 | 180 | 180 | | | | | | | |
| 0D | | | 100 | 114 | 12C | 148 | 170 | 1A0 | 1D0 | | | | | | | |
| 0E | | 100 | 113 | 128 | 144 | 160 | 188 | 1C0 | | | | | | | | |
| 0F | 100 | 112 | 126 | 140 | 158 | 180 | 1A0 | 1E0 | | | | | | | | |
| 10 | 100 | 124 | 138 | 150 | 172 | 190 | 1C0 | | | | | | | | | |
| 11 | 100 | 134 | 14C | 168 | 188 | 180 | 1E0 | | | | | | | | | |
| 12 | 100 | 148 | 160 | 180 | 1A0 | 1C0 | | | | | | | | | | |
| 13 | 100 | 158 | 170 | 190 | 1B0 | 1E0 | | | | | | | | | | |
| 14 | 100 | 168 | 188 | 1A0 | 1D0 | | | | | | | | | | | |
| 15 | 100 | 180 | 198 | 1C0 | 1E0 | | | | | | | | | | | |
| 16 | 100 | 190 | 1B0 | 1D0 | | | | | | | | | | | | |
| 17 | 100 | 1A0 | 1D0 | 1E0 | | | | | | | | | | | | |
| 18 | 100 | 1B0 | 1D0 | | | | | | | | | | | | | |
| 19 | 100 | 1C0 | 1E0 | | | | | | | | | | | | | |
| 1A | 100 | 1D0 | | | | | | | | | | | | | | |
| 1B | 100 | 1E0 | | | | | | | | | | | | | | |
| 1C | 100 | | | | | | | | | | | | | | | |
| 1D | 100 | | | | | | | | | | | | | | | |
| 1E | 100 | | | | | | | | | | | | | | | |
| 1F | 100 | | | | | | | | | | | | | | | |

Fig. 8A

| Bit0 | Bit1 | Bit2 | Bit3 | 0 | 1 | 2 | 3 | 4 | 5 | 6 | 7 | 8 | 9 | A | B | C | D | E | F |
|---|---|---|---|---|---|---|---|---|---|---|---|---|---|---|---|---|---|---|---|
| 0 | 0 | 0 | 0 | 1 | 0 | 0 | 0 | 0 | 0 | 0 | 0 | 0 | 0 | 0 | 0 | 0 | 0 | 0 | 0 |
| 0 | 0 | 0 | 1 | 0 | 1 | 0 | 0 | 0 | 0 | 0 | 0 | 0 | 0 | 0 | 0 | 0 | 0 | 0 | 0 |
| 0 | 0 | 1 | 0 | 0 | 0 | 1 | 0 | 0 | 0 | 0 | 0 | 0 | 0 | 0 | 0 | 0 | 0 | 0 | 0 |
| 0 | 0 | 1 | 1 | 0 | 0 | 0 | 1 | 0 | 0 | 0 | 0 | 0 | 0 | 0 | 0 | 0 | 0 | 0 | 0 |
| 0 | 1 | 0 | 0 | 0 | 0 | 0 | 0 | 1 | 0 | 0 | 0 | 0 | 0 | 0 | 0 | 0 | 0 | 0 | 0 |
| 0 | 1 | 0 | 1 | 0 | 0 | 0 | 0 | 0 | 1 | 0 | 0 | 0 | 0 | 0 | 0 | 0 | 0 | 0 | 0 |
| 0 | 1 | 1 | 0 | 0 | 0 | 0 | 0 | 0 | 0 | 1 | 0 | 0 | 0 | 0 | 0 | 0 | 0 | 0 | 0 |
| 0 | 1 | 1 | 1 | 0 | 0 | 0 | 0 | 0 | 0 | 0 | 1 | 0 | 0 | 0 | 0 | 0 | 0 | 0 | 0 |
| 1 | 0 | 0 | 0 | 0 | 0 | 0 | 0 | 0 | 0 | 0 | 0 | 1 | 0 | 0 | 0 | 0 | 0 | 0 | 0 |
| 1 | 0 | 0 | 1 | 0 | 0 | 0 | 0 | 0 | 0 | 0 | 0 | 0 | 1 | 0 | 0 | 0 | 0 | 0 | 0 |
| 1 | 0 | 1 | 0 | 0 | 0 | 0 | 0 | 0 | 0 | 0 | 0 | 0 | 0 | 1 | 0 | 0 | 0 | 0 | 0 |
| 1 | 0 | 1 | 1 | 0 | 0 | 0 | 0 | 0 | 0 | 0 | 0 | 0 | 0 | 0 | 1 | 0 | 0 | 0 | 0 |
| 1 | 1 | 0 | 0 | 0 | 0 | 0 | 0 | 0 | 0 | 0 | 0 | 0 | 0 | 0 | 0 | 1 | 0 | 0 | 0 |
| 1 | 1 | 0 | 1 | 0 | 0 | 0 | 0 | 0 | 0 | 0 | 0 | 0 | 0 | 0 | 0 | 0 | 1 | 0 | 0 |
| 1 | 1 | 1 | 0 | 0 | 0 | 0 | 0 | 0 | 0 | 0 | 0 | 0 | 0 | 0 | 0 | 0 | 0 | 1 | 0 |
| 1 | 1 | 1 | 1 | 0 | 0 | 0 | 0 | 0 | 0 | 0 | 0 | 0 | 0 | 0 | 0 | 0 | 0 | 0 | 1 |

Fig. 8B

| | SIGN | Bit0 | Bit1 | Bit2 | Bit3 | 0 | 1 | 2 | 3 | 4 | 5 | 6 | 7 | 8 | 9 | A | B | C | D | E | F |
|---|---|---|---|---|---|---|---|---|---|---|---|---|---|---|---|---|---|---|---|---|---|
| | 0 | 0 | 0 | 0 | 0 | 0 | 1 | 0 | 0 | 0 | 0 | 0 | 0 | 0 | 0 | 0 | 0 | 0 | 0 | 0 | 0 |
| | 0 | 0 | 0 | 0 | 1 | 0 | 0 | 1 | 0 | 0 | 0 | 0 | 0 | 0 | 0 | 0 | 0 | 0 | 0 | 0 | 0 |
| | 0 | 0 | 0 | 1 | 0 | 0 | 0 | 0 | 1 | 0 | 0 | 0 | 0 | 0 | 0 | 0 | 0 | 0 | 0 | 0 | 0 |
| | 0 | 0 | 0 | 1 | 1 | 0 | 0 | 0 | 0 | 1 | 0 | 0 | 0 | 0 | 0 | 0 | 0 | 0 | 0 | 0 | 0 |
| ② | 0 | 0 | 1 | 0 | 0 | 0 | 0 | 0 | 0 | 0 | 1 | 0 | 0 | 0 | 0 | 0 | 0 | 0 | 0 | 0 | 0 |
| | 0 | 0 | 1 | 0 | 1 | 0 | 0 | 0 | 0 | 0 | 0 | 1 | 0 | 0 | 0 | 0 | 0 | 0 | 0 | 0 | 0 |
| | 0 | 0 | 1 | 1 | 0 | 0 | 0 | 0 | 0 | 0 | 0 | 0 | 1 | 0 | 0 | 0 | 0 | 0 | 0 | 0 | 0 |
| | 0 | 0 | 1 | 1 | 1 | 0 | 0 | 0 | 0 | 0 | 0 | 0 | 0 | 1 | 0 | 0 | 0 | 0 | 0 | 0 | 0 |
| | 0 | 1 | 0 | 0 | 0 | 0 | 0 | 0 | 0 | 0 | 0 | 0 | 0 | 0 | 1 | 0 | 0 | 0 | 0 | 0 | 0 |
| | 0 | 1 | 0 | 0 | 1 | 0 | 0 | 0 | 0 | 0 | 0 | 0 | 0 | 0 | 0 | 1 | 0 | 0 | 0 | 0 | 0 |
| | 0 | 1 | 0 | 1 | 0 | 0 | 0 | 0 | 0 | 0 | 0 | 0 | 0 | 0 | 0 | 0 | 1 | 0 | 0 | 0 | 0 |
| | 0 | 1 | 0 | 1 | 1 | 0 | 0 | 0 | 0 | 0 | 0 | 0 | 0 | 0 | 0 | 0 | 0 | 1 | 0 | 0 | 0 |
| | 0 | 1 | 1 | 0 | 0 | 0 | 0 | 0 | 0 | 0 | 0 | 0 | 0 | 0 | 0 | 0 | 0 | 0 | 1 | 0 | 0 |
| | 0 | 1 | 1 | 0 | 1 | 0 | 0 | 0 | 0 | 0 | 0 | 0 | 0 | 0 | 0 | 0 | 0 | 0 | 0 | 1 | 0 |
| | 0 | 1 | 1 | 1 | 0 | 0 | 0 | 0 | 0 | 0 | 0 | 0 | 0 | 0 | 0 | 0 | 0 | 0 | 0 | 0 | 1 |
| | 0 | 1 | 1 | 1 | 1 | 0 | 0 | 0 | 0 | 0 | 0 | 0 | 0 | 0 | 0 | 0 | 0 | 0 | 0 | 0 | 0 |
| | 1 | 0 | 0 | 0 | 0 | 0 | 0 | 0 | 0 | 0 | 0 | 0 | 0 | 0 | 0 | 0 | 0 | 0 | 0 | 0 | 0 |
| | 1 | 0 | 0 | 0 | 1 | 1 | 0 | 0 | 0 | 0 | 0 | 0 | 0 | 0 | 0 | 0 | 0 | 0 | 0 | 0 | 0 |
| | 1 | 0 | 0 | 1 | 0 | 0 | 1 | 0 | 0 | 0 | 0 | 0 | 0 | 0 | 0 | 0 | 0 | 0 | 0 | 0 | 0 |
| | 1 | 0 | 0 | 1 | 1 | 0 | 0 | 1 | 0 | 0 | 0 | 0 | 0 | 0 | 0 | 0 | 0 | 0 | 0 | 0 | 0 |
| ③ | 1 | 0 | 1 | 0 | 0 | 0 | 0 | 0 | 1 | 0 | 0 | 0 | 0 | 0 | 0 | 0 | 0 | 0 | 0 | 0 | 0 |
| | 1 | 0 | 1 | 0 | 1 | 0 | 0 | 0 | 0 | 1 | 0 | 0 | 0 | 0 | 0 | 0 | 0 | 0 | 0 | 0 | 0 |
| | 1 | 0 | 1 | 1 | 0 | 0 | 0 | 0 | 0 | 0 | 1 | 0 | 0 | 0 | 0 | 0 | 0 | 0 | 0 | 0 | 0 |
| | 1 | 0 | 1 | 1 | 1 | 0 | 0 | 0 | 0 | 0 | 0 | 1 | 0 | 0 | 0 | 0 | 0 | 0 | 0 | 0 | 0 |
| | 1 | 1 | 0 | 0 | 0 | 0 | 0 | 0 | 0 | 0 | 0 | 0 | 1 | 0 | 0 | 0 | 0 | 0 | 0 | 0 | 0 |
| | 1 | 1 | 0 | 0 | 1 | 0 | 0 | 0 | 0 | 0 | 0 | 0 | 0 | 1 | 0 | 0 | 0 | 0 | 0 | 0 | 0 |
| | 1 | 1 | 0 | 1 | 0 | 0 | 0 | 0 | 0 | 0 | 0 | 0 | 0 | 0 | 1 | 0 | 0 | 0 | 0 | 0 | 0 |
| | 1 | 1 | 0 | 1 | 1 | 0 | 0 | 0 | 0 | 0 | 0 | 0 | 0 | 0 | 0 | 1 | 0 | 0 | 0 | 0 | 0 |
| | 1 | 1 | 1 | 0 | 0 | 0 | 0 | 0 | 0 | 0 | 0 | 0 | 0 | 0 | 0 | 0 | 1 | 0 | 0 | 0 | 0 |
| | 1 | 1 | 1 | 0 | 1 | 0 | 0 | 0 | 0 | 0 | 0 | 0 | 0 | 0 | 0 | 0 | 0 | 1 | 0 | 0 | 0 |
| | 1 | 1 | 1 | 1 | 0 | 0 | 0 | 0 | 0 | 0 | 0 | 0 | 0 | 0 | 0 | 0 | 0 | 0 | 1 | 0 | 0 |
| | 1 | 1 | 1 | 1 | 1 | 0 | 0 | 0 | 0 | 0 | 0 | 0 | 0 | 0 | 0 | 0 | 0 | 0 | 0 | 1 | 0 |

Fig. 9A

| m1 / CPA1 | − 16 | − 14 | − 12 | | + 12 | + 14 |
|---|---|---|---|---|---|---|
| − 32 | L′-32,-16 | L′-32,-14 | L′-32,-12 | | L′-32,-12 | L′-32, 14 |
| − 30 | L′-30,-16 | L′-30,-14 | L′-30,-12 | | | |
| − 28 | L′-28,-16 | | | | | |
| − 2 | L′-2,-16 | | | | | |
| 0 | L′ 0,-16 | | | | | |
| + 2 | L′ 2,-16 | | | | | |
| + 28 | L′ 28,-16 | | | | | |
| + 30 | L′-30,-16 | | | | | |

Fig. 9B

| CPA 2 \ m2 | +1 |
|---|---|
| −32 | L″−32 |
| −31 | L″−31 |
| −30 | L″−30 |
| −2 | L″−2 |
| −1 | L″−1 |
| 0 | L″ 0 |
| +1 | L″ 1 |
| +30 | L″ 30 |
| +31 | L″ 31 |

NONRESTORING DIVIDER

BACKGROUND OF THE INVENTION

1. Field of the Invention

The present invention relates to a nonrestoring divider. More particularly, it relates to a high speed circuit construction by which a circuit for predicting a partial quotient is formed by a lesser amount of hardware.

2. Description of the Related Art

Conventionally, a nonrestoring divider system is used as one element of a divider system. In a nonrestoring divider, sets of quotients used for forming digits of the quotient are previously determined and each digit of the quotient is selected from sets of quotients that do not include a zero, whenever possible.

These particular sets of the quotients excluding zero are usually expressed as follows, wherein "r" represents the radix.

$$-(r-1), =(r-2), \ldots, -1, +1, \ldots, r-2, r-1$$

In many calculators, calculation is carried out by using an operation unit having a plurality of bits rather than just a one-bit operation unit, and obviously, a radix larger than 2 is used. For example, the radix is 4 in a 2 bit unit, and 8 in a 3 bit unit.

Generally, an operation unit of l bits can be expressed as having an m digit number r as the radix, and is determined as:

$$r = 2^{l/m}$$

A characteristic feature of nonrestoring type division is the use of a negative number as well as a positive number in the partial remainder which results from a previous operation in which a digit of the quotient is determined. Also, the dividend (or partial remainder) or multiple of the dividend (or partial remainder) is added or subtracted by the sign of the dividend (or partial remainder) by using the negative or positive number in the result of the operation.

For example, the values which result from multiplying the division by k [where $k = -(r-1), -(r-2), \ldots, -1, +1, \ldots, r-2, r-1$] are set in registers, these registers are selected by a predicting signal output from a partial quotient predictor, and the quotient is obtained by repeatedly adding or subtracting the value which results from multiplying the division by k.

In such a nonrestoring divider system, when the number of bits "n" used as the operation unit becomes large, the radix is increased, for example, to 2n, so that the number of operation repetitions can be decreased and high speed operation can be expected. However, the multiplying of the divisor becomes complex, and therefore, the predicting logic for the quotient must be precise, which brings about a problem in that the number of circuits must be considerably increased. Furthermore, with respect to the logic for predicting the partial quotient, a method has not been developed in the prior art for forming an effective predicting circuit for the partial quotient.

SUMMARY OF THE INVENTION

An object of the present invention is to provide a nonrestoring divider which can decrease the time needed for predicting the partial quotient.

Another object of the present invention is to provide a nonrestoring divider which can decrease the amount of hardware used by the logic circuit predicting the partial quotient.

The above-mentioned objects can be achieved by providing a divider apparatus which includes a divisor register for storing a divisor, a partial remainder resister for storing a dividend or a partial remainder, a predictor for predicting a partial quotient, a multiplier for multiplying the content of the divisor register, a first adder for subtracting the output of the multiplier from the content of the partial remainder register and for calculating the partial remainder in such a manner that the predictor predicts the partial quotient from upper digits of the divisor register and upper digits of the partial remainder, and for repeating a cycle which stores the output of the adder in the partial remainder register, thus carrying out a division operation.

According to the present invention, the divider apparatus also comprises a second adder for determining the difference between the upper digits of the multiplier and the upper digits of the partial remainder register, a first predictor for predicting the partial quotient (m) from the output of the first adder and the upper digits of the divisor register, a second predictor for predicting the partial quotient from a corrected output of the second adder and the digits of the divisor register, a carry predictor for determining the carry to be propagated to the second adder from the remaining digits of the multiplier and the remaining digits of the partial remainder register, and a selector for selecting either the output of the first predictor circuit or that of the second predictor in dependence upon the output of the carry predictor, thereby making the output of the second predictor a predicted quotient.

Further features and advantages of the present invention will be apparent from the ensuing description with reference to the accompanying drawings to which, however, the scope of the invention is in no way limited.

BRIEF EXPLANATION OF THE DRAWINGS

FIG. 2 is a block diagram of one example of the multiplier 2 illustrated FIG. 1;

FIG. 3 is a block diagram of one example of the circuit 3 for predicting a partial quotient shown in FIG. 1, FIG. 4 is a table showing the contents of the circuit for predicting a partial quotient;

FIG. 7 is a diagram showing the contents of a table for predicting a partial quotient shown in FIG. 5;

FIGS. 8A and 8B are diagrams showing logic operations of the decoder shown in FIG. 5; and FIGS. 9A and 9B are diagrams showing another example of the contents of a table for predicting a partial quotient.

DESCRIPTION OF THE PREFERRED EMBODIMENTS

Figure 1:
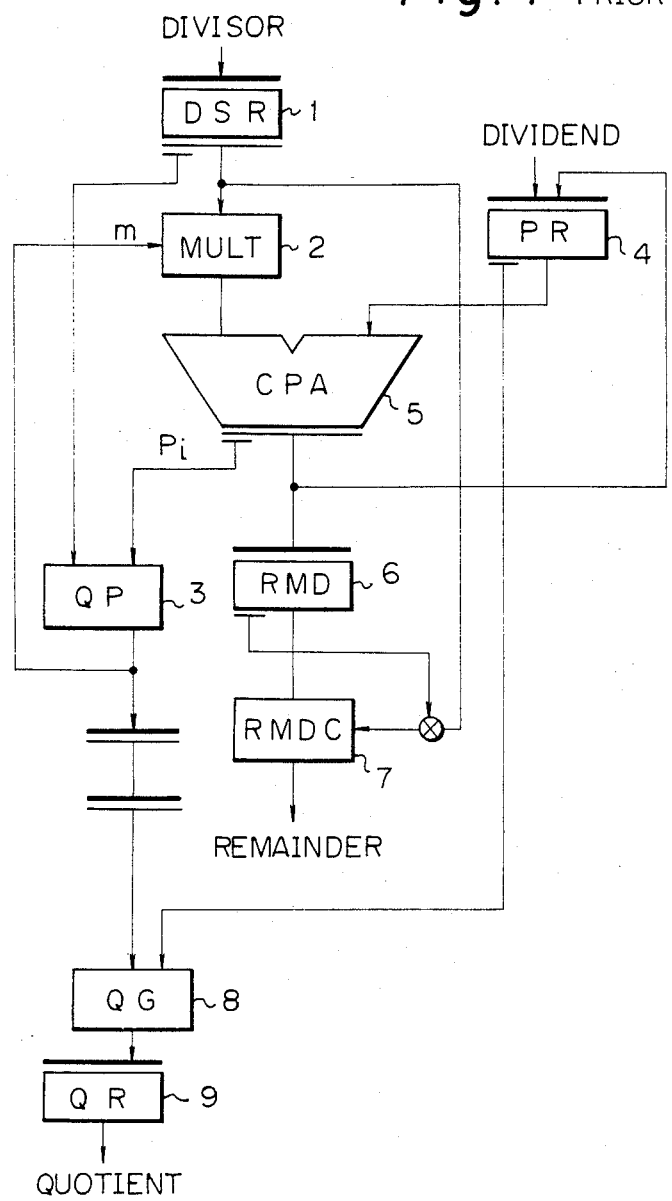
FIG. 1 is a block diagram of one example of a conventional nonrestoring divider apparatus.

FIG. 1 is a block diagram of one example of a conventional nonrestoring divider. In FIG. 1, numeral 1 designates a divisor register (DSR) in which a divisor is stored and from which the divisor is supplied to a multiplier (MULT) 2. The multiplier (MULT) 2 receives a partial quotient predicting signal (shown as "m") from a partial quotient predictor (QP) 3 and forms multiples, i.e., multiplies the divisor by −15, −14, −13, ..., −2, −1, 0, +1, +2, ..., +14, +15 (when the radix is 16). Note that in this circuit, a method in which whole multiples are previously formed and selected, a method which uses a general adder, or a method which calculates by using a smaller number of divisor registers than the radix and multi-stage carry/save adders can be used.

Reference numeral 4 designates a partial remainder register (PR), wherein after the dividend is set at the first operation cycle, a new partial remainder is set at every operation cycle. Reference numeral 5 designates a carry propagate adder (CPA), which carries out the addition of the contents of the partial remainder register (PR) 4 and a divisor multiplied by $m(-15 \leq m \leq +15$ where m is an integer), and the result thereof is output to the partial quotient register (PR) 4, the partial quotient predictor (QP) 3, and a remainder register 6.

The remainder register 6 holds the final predicted remainder for the repetition operation, and after the adding and subtracting operations are repeated, a correct quotient is output via a remainder corrector (RMDC) 7. In a concrete correcting method in the remainder corrector (RMDC) 7, when a sign bit of the remainder register (RMD) 6 is negative, the complement of RMD6 is determined as the remainder, and when the sign bit of the remainder register 6 is positive, the value in RMD6 is determined as the remainder.

A partial quotient generator (QG) 8 compares the output of the partial quotient predicting circuit (QP) 3 and the sign bit of the partial remainder register (PR) 4, so that a correct partial quotient is determined and stored in a quotient register (QR) 9.

The partial quotient predicting circuit (QP) 3, according to the present invention, calculates the value of m used in the operation m×DSR to be calculated next from the output of the carry propagate adder (CPA) 5 and the output of the divisor register (DSR) 1. Logically, the QP circuit 3 uses the values in the above-mentioned CPA and DSR to retrieve a value for m from a table. However, when the CPA and DSR are used in this way, the table is extremely large. For example, in the nonrestoring dividing operation having a radix of 16, including the sign bit, the following table would be formed:

CPA: 6 bits (64 entries)

DSR: 9 bits (256 entries)

wherein, as shown hereinafter, the divisor is normalized so that the most significant bit is 1.

Therefore, in practice, the CPA value and m are used as the addresses, and a DSR table is formed, in such a manner that the table is reversely retrieved. In the example mentioned above, m has 5 bits including the sign, CPA has 6 bits including the sign, and as mentioned above, the size of the table is 64×32 entries, so that the size of the table is decreased to about ½ the size of a table addressed by CPA and DSR. Referring to the adding and subtracting result (CPA)=0, the table above is almost symmetrical, and the possibility of retrenchment is included.

FIG. 2 is a diagram illustrating the operation of the multiplier shown in FIG. 1. In FIG. 2, 11 designates multiply circuits [×(−15)∼ ×15], 12 designates divisor registers (−15DSR∼ +15DSR), and 13 designates a selector. In the conventional system, when the radix is 16, thirty kinds of multiplier registers −15× divisor, −14× divisor, ..., −2× divisor, − × divisor, 1× divisor (which may be DSR 1), 2× divisor, ..., 14× divisor, 15× divisor are necessary. These thirty kinds of data are formed by the multiply circuits [×(−15), ..., ×15] 11, the outputs of which are held in the divisor registers (−15DSR) 12, and the outputs of the divisor registers 12 are supplied to the selector 13. In the selector 13, the values held in the registers 12 are selected by the signal m, that is, one of the thirty multiples of the divisor is selected.

FIG. 3 is a diagram showing a principle of the partial quotient predicting circuit QP shown in FIG. 1. In FIG. 3, the six upper bits of the carry propagating adder 5 are supplied to a memory 14 as an address, and in the memory 14, the contents are divided into thirty one groups each having 9 bits, that is $D_F, D_E, \ldots, D_O, D_{-1}, D_{-2} \ldots D_{-F}$ (where the subscripts are hexacecimal numbers). The divided values $D_F, D_E, \ldots, D_O, D_{-1}, \ldots, D_{-F}$ are supplied to comparators $15_F \ldots 15_O, \ldots 15_{-F}$. Further, the upper five bits of the divisor (DSR) is supplied to other input terminals of the comparators $15_F \sim 15_O$. In each of the comparators $15_F \sim 15_O$, the input is formed by a 9 bit signal, but the output thereof is a one bit signal. When the inputs have the relationship $A \geq B$, the output becomes "1", and when the inputs have the relationship $A < B$, the output becomes "0". In FIG. 3, 16 is a circuit for detecting the left-most comparator 15 that outputs a "1" bit.

FIG. 4 is a table which is addressed by the output of the CPA and m as entries and designates the value of the DSR. The table shown in FIG. 4 has 64×31 entries. In FIG. 4, CPAO has the value of which the upper 6 bits (including the sign) of the CPA output, designated as a decimal number, and m is the signal of the partial quotient predicting circuit (QP) 3 designated by the decimal number. Such a table look up system can be replaced by a random logic circuit which performs the same function.

The CPAO row, m column in the partial quotient predicting table [QPT(CPAO, m)] designates a logical function corresponding to the upper 9 bits of the DSR (hereinafter referred to as DSRO) and have a value "1" or "0" the value will be (hereinafter, referred to as [LcpaO, m(DSRO)]). For the purpose of simplifying the explanation, it is assumed that the DSR is normalized so that it is a positive integer and the most significant bit is 1.

First, the principle of a nonrestoring divider will be explained. Where the divisor is D, the dividend is the initial value of $P_n$, the partial remainder is $P_{n+1}$, and the partial remainder predicting signal is m, then the dividing operation in the nonrestoring divider is expressed by the following asymptotic equation, $$P_{n+1} = P_n + m \times D$$

and in the n+1'th quotient $Q_{n+1}$, it is sufficient that the partial quotient satisfies the following condition, $$-D < P_n \times m + D < D$$

Therefore, the logic function "LcpaO, m(DSRO)" has the following conditions.

1. This logic function "LcpaO, m(DSRO)" is 1 when the dividing condition $$-D < P_n + m \times D < D$$

is satisfied for all (D, $P_n$) which satisfy $$DSRO \leq D < DSRO + \delta [\text{wherein } \delta = (\frac{1}{2})^8]$$

$$CPAO \leq P_n < CPAO + \epsilon [\text{wherein } \epsilon = 1],$$

and this function becomes 0, except for the above,

2. When the following relationship exists between m and m'

$$LcpaO, m(DSRO) = LcpaO, m'(DSRO) = 1$$

wherein one is determined as "1" and the other is determined as "0".

3. The condition wherein the partial quotient predicting table formed by using the process mentioned above functions is that where one m exists for all CPAO, DSRO, and the following equation is satisfied for such an m $$LcpaO, m(DSRO) = 1$$

The term "CONDITION I" will be used when all three of the above conditions are met.

The partial quotient predicting table formed by above-mentioned method is shown in FIG. 4. In FIG. 4, when a DSRO having 9 bits is input, only one m exists for all CPAO (64 possible values) and the corresponding logic function is $$LcpaO, m(DSRO) = 1.$$

If the DSRO is 8 bits, only one m exists for all CPAO and the condition:

$$LcpaO, m(DSRO) = 1$$

is not satisfied, so that the table does not function as the partial quotient predicting table.

Further, if the DSRO is 10 bits, it becomes redundant since only one m exists for all CPAO. Therefore, when the DSRO is 9 bits, this may be said to be the most suitable number of bits in the DSRO for retrieving m in the nonrestoring divider wherein the radix is 16.

Figure 5:
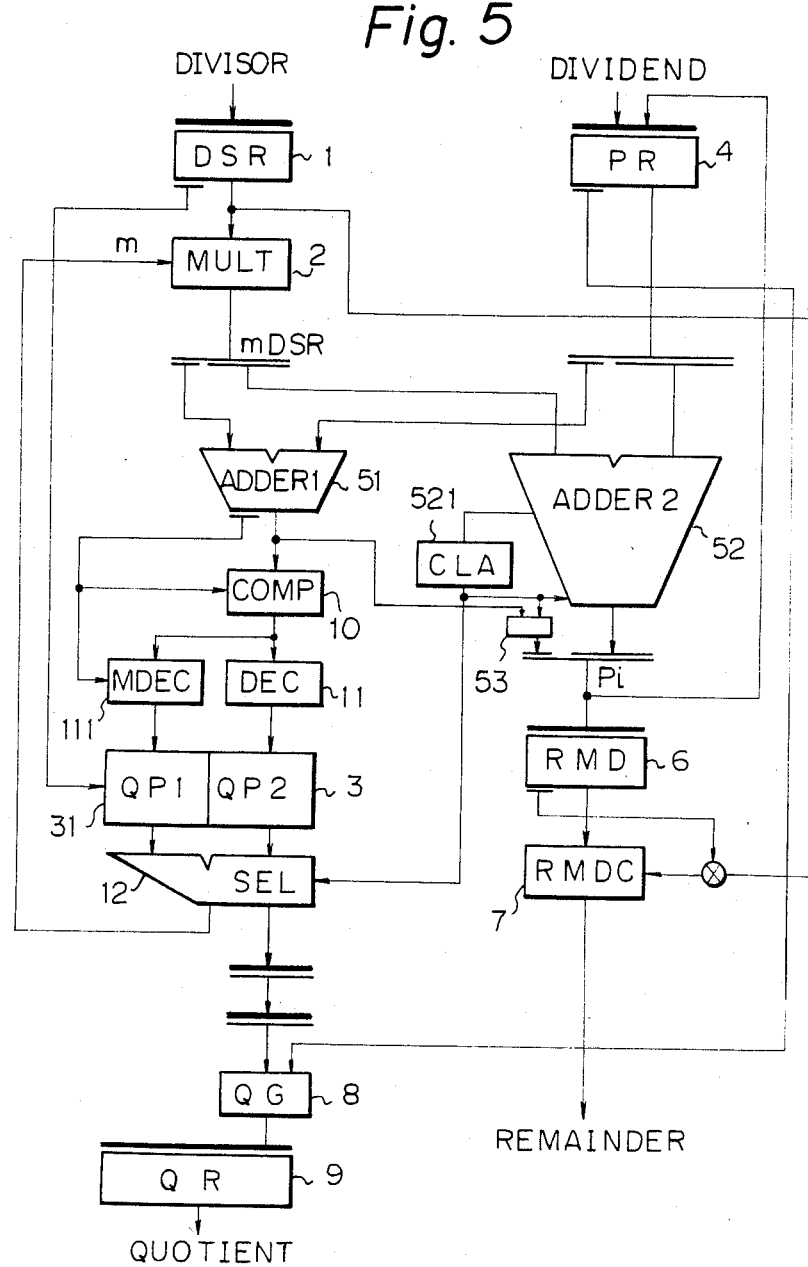
FIG. 5 is a block diagram of one embodiment of a nonrestoring divider apparatus according to the present invention.

FIG. 5 is a block diagram of one embodiment of the nonrestoring divider apparatus according to the present invention. In FIG. 5, the same symbols correspond to the same elements as shown in FIG. 1. In FIG. 5, an adder 51 adds the upper bits of the partial remainder register (PR) 4 and the upper bits of output of the multiplier (MULT) 2, that is, the upper bits of mDSR, without using the carry signal from an adder 52 (the output signal of the carry predicting circuit (CLA) 521). The output of adder 51 is supplied to a complement generator 10 and the remainder register (RMD) 6 via a carry adding circuit 53.

In the complement generator 10, when the sign bit of the adder (ADDER 1) 51 is "1", the complement of the input data (output of the adder 51) is output to the decoder 11, and when the sign bit is "0", the input data is directly output to the decoder 11. In the decoder 11, the result obtained from the complement generator (COMP) 10 is decoded and supplied to the partial quotient predicting circuit (QP2) 3.

The adder (ADDER 2) 52 receives the lower bits of the partial remainder register (PR) 4 and the lower bits of the output (mDSR) of the multiplier (MULT) 2, and a carry look-ahead circuit (CLA) 521 is attached thereto for the purpose of carrying out high speed operations. The output of the adder 51 is also input to the carry adding circuit 53 to be compensated by the output of CLA 521 and fed to RMD6 by being concatenated with the output of adder 52.

The present invention provides new functional blocks, that is, a modified decoder circuit (MDEC) 111, a selector (SEL) 12, and a partial quotient predicting circuit (QP1) 31 having the same function as that of the partial quotient predicting circuit (QP) 3 explained in FIG. 1 to FIG. 4. The basic operation of the apparatus shown in FIG. 5 is similar to the conventional system, therefore, only the characteristic features of the present invention will be explained hereinafter.

First, the modified decoder circuit (MDEC) 111 forms, in principle, the decode signal assuming +1 when the sign bit of the adder (ADDER 1) 51 is "0" (positive) and the decode signal assuming −1 when the sign bit of the adder 51 is "1" (negative). The selector 12 selects either the partial quotient predicting circuit (AP1) 3 or (QP2) 31 depending upon the output signal of the carry predicting circuit (CLA) 521.

Concretely, when the output of the carry predicting circuit (CLA) 521 is "1" (that is, a carry exists), the selector 12 selects the partial quotient circuit (QP1) 31, and where the output of the circuit (CLA) 521 is "0" (that is, no carry exists), the partial quotient circuit (QP2) 3 is selected. The function of the modified decoder circuit (MDEC) will be explained in detail later with reference to FIGS. 8A and 8B.

Figure 6:
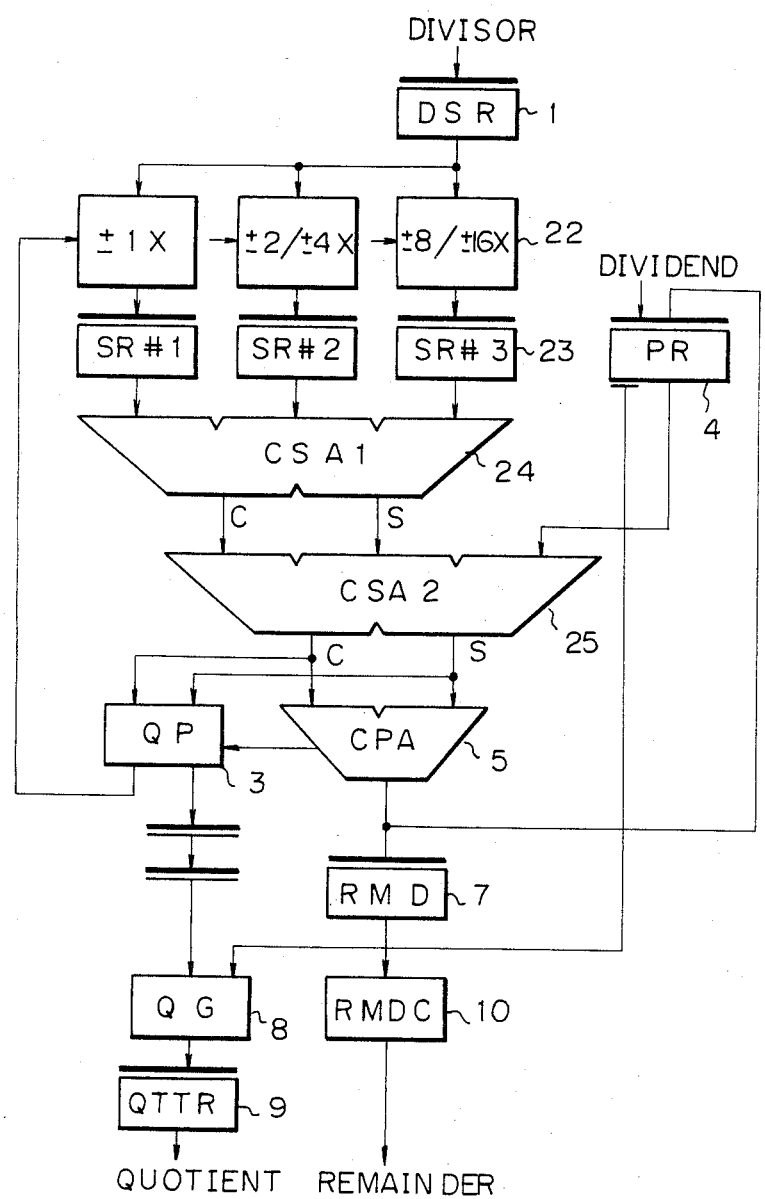
FIG. 6 is a block diagram of a second embodiment of the present invention with an improvement of the multiplier shown in FIG. 5.

FIG. 6 is a block diagram of another embodiment of the present invention. In FIG. 6, 22 designates multipliers ($\pm 1\times$, $+2/+4\times$, $+8/+16\times$) which are formed by a complement circuit and a shifter, wherein multiplication in the + side is achieved by shift only and multiplication in the − side is achieved by using the complement; 23 designates divisor or product registers (SR #1, SR #2, SR #3); 24 and 25 carry/save adders (CSA1, CSA2) having three inputs; C designates a carry signal; and S designates a sum signal.

In the circuit shown in FIG. 6, the divisor registers 23 [corresponding to (+15DSR~−15 DSR) in FIG. 2] are formed by three registers (SR #1~SR #3) the number of which is smaller than the number of bits (4), and the outputs of four registers SR #1, SR #2, SR #3 and the partial remainder register(PR) 4 are added by using two carry/save adders 24, 25 having three inputs.

When the divisor is set in the divisor register (DSR) 1 and the dividend is set in the partial remainder register (PR) 4, the dividend is supplied via the three-input carry/save adder (CSA 2) 25 to the partial quotient predicting circuit (QP) 3, and a signal predicting the most significant digit of the quotient is output. This predicting signal selects a plurality of routes by which the output of the divisor register 1 is multiplied by the multipliers 22 ($\pm 1\times$, $\pm 2/\pm 4\times$, $\pm 8/\pm 16\times$), and the outputs (products) thereof are set in the product registers (SR #1, SR #2, SR #3) 23.

Next, the outputs of the divisor registers (SR #1, SR #2, SR #3) 23 and the output of the partial remainder register (PR) 4 are added by using the three-input carry/save adders (CSA1, CSA2) 24, 25 and the carry propagation adder 5, and the output thereof is again input to the partial remainder register (PR) 4.

The output (C, S) of the three-input carry/save adder (CSA2) 25 is supplied to the partial quotient predicting circuit (QP) 3, to determine how the three kinds of divisor registers (SR #1, SR #2, SR #3) which will be selected next.

FIG. 7 is a diagram showing one embodiment of the partial quotient predicting table according to the present invention. First, the concept of the present invention will be explained. At the i'th step of the nonrestoring division, the following equations are used.

$$P_{i+1} = p_i - m_i \times d \quad \quad 1$$

$$-d < P_{i+1} < d \quad \quad 2$$

wherein pi designates a partial remainder, d is a divisor, r is a radix, and when the radix is r, $m_i$ is expressed as $$-r+1 \leq m_i \leq r-1$$

The value $m_i$ is selected so that the value of $P_{i+1}$ obtained by calculating the equation 1 satisfies the equation 2, and the equation 1 is calculated by using an selected $m_i$.

In the actual computer and in the best case, the upper bits of $p_i$ and d corresponding to $P_i$ in CPA and D in DSR] are extracted by digits sufficient to ensure accuracy in determining $m_i$, the value of $m_i$ is determined by using the partial quotient predicting table, and thereafter a precise $P_{i+1}$ is calculated by using equation 1.

As to the calculation of $m_i \times d$, a method for using the multiplier, a method for using a divisor register at every multiple, a method for using carry/save adders, etc., are well known and the subtraction $p_i - m_i \times d$ is carried out by using a well known adding and subtracting circuit, etc.

One of the features of the present invention lies within the carrying out of the function of determining a value for $m_i$ which satisfies the equation 2 from $P_i$ and D above by using the smallest possible amount of hardware.

As mentioned above and when $P_i$, D are fixed, a plurality of values of $m_i$ exist which satisfy the equations 1 and 2 at the same time. When the quotient set in the nonrestoring divider is the set X [[=(-r, -r+1, ..., -1, 0, 1, ..., r-1, r), wherein r is the radix], the set $M(P_i, D)$ of $m_i$ which satisfies equations 1 and 2 at the i'th step, is a subset of X, and usually a plurality of elements exist. That is, $$M(P_i, D) < X \quad \quad 3$$

Furthermore, N is specified as the mapping which is mapped from a subset of X and in which the sign of each element is inverted. That is, when $$A < X, B < X,$$

then
$$[N(A) = B] \rightleftarrows [X \epsilon A \rightleftarrows - X \epsilon B \text{ for all x's}]$$

When the complement of $P_i$ is shown by $\bar{P}_i$, $M(\bar{P}_i, D)$, $N[M(\bar{P}_i, D)]$ have a commmon portion, but they are not coincident. That is, generally, $$M(P_i, D) \neq N[M(\bar{P}_i, D)] \quad \quad 4$$

$$M(P_i, D) \cap N[M(\bar{P}_i, D)] \neq \phi \quad \quad 5$$

In the above mentioned equation, when the common portion is set as M', $$M'(P_i, D) = M(P_i, D) \cap N[M(\bar{P}_i, D)].$$

In other words, when $P_i \geq 0$, a suitable $m_i$ can be determined by selecting one element from M'($P_i$, D), and when $P_i < 0$, a suitable $m_i$ can be determined by selecting one element from N[M'($P_i$, D)]. Therefore, when the system of the present invention is used, the table which determines $m_i$ from any $P_i$ and D is provided only for $P_i \geq 0$, so that the size of the table can be reduced by about one-half.

The above theoretical discussion will be explained by using the example of a nonrestoring division by which a quotient having 4 bits (that is radix r=16) is obtained in one cycle time (one step). When r=16, for the purpose of determining $m_i$, if $P_i$ is 6 bits including the sign and D is 9 bits (however, for the purpose of simplicity, D is previously normalized so that D is positive and the most significant bit is "1"). Further, the following relationship exists between the accuracies of the $P_i$, D mentioned above. That is, when one is rough, the other requires high accuracy. The above relationship, that is, $P_i = 6$ bits and D=9 bits, is one combination meeting the requirement of that relationship.

As a concrete example of the $P_i$ and D mentioned above, when $$P_i = 001011 \text{ (upper 6 bits)}$$

$$D = 110000000 \text{ (upper 9 bits)}$$

it can be shown that in the set of values for $m_i$ which satisfies the above equations 1, 2, two values exist, 7 and 8. That is, $$M(P_i, D) = \{7, 8\},$$

and similarly, it can be shown that $$M(\bar{P}_i, D) = \{-8\}.$$

Then, from the definition of the mapping mentioned above, it may be said that $$N[M(\bar{P}_i, D)] = \{8\}$$

and $$M(P_i, D) \neq N[M(\bar{P}_i, D)]$$

and further $$M'(P_i, D) = M(P_i, D) \cap N[M(\bar{P}_i, D)] = \{8\}$$

When using the table of M'($P_i$, D), if the upper bits $P_i$ of the input $P_i$ are =001011"=$(P_i)_a$ (that is $P_i \geq 0$) $P_i$ is $$P_i = (P_i)_a$$

therefore, $$M(P_i, D) = M[(P_i)_a, D] = \{7, 8\}$$

and $$M'((P_i)_a, D) = M'(P_i, D) = \{8\}$$

and then, if $$M(P_i, D) > M'(P_i, D) = \{8\}$$

therefore, $$M(P_i, D) \ni 8$$

Similarly, when

'110100' = $(P_i)_b$ (that is, $P_i < 0$), if $\overline{P}_i$ is defined as $$\overline{P}_i = \overline{(P_i)_b},$$

then $$\overline{(P_i)_b} = \overline{P}_i = '001011' = (P_i)_a$$

and $$M'(\overline{(P_i)_b}, D) = M'(P_i, D)$$

On the other hand, $$N[M(\overline{P}_i, D)] > M'(P_i, D) = \{8\}$$

therefore, $$N[M(\overline{P}_i, D)] \ni 8$$

Thus, in accordance with the definition of the mapping, the following relationship can be obtained:

$$M[\overline{(P_i)_b}, D] = M(P_i, D) \ni -8$$

Also, when $P_i < 0$, the same result as that calculated above is obtained by the table of $M'(P_i, D)$. Therefore, it is known that the correct result can be obtained even if such a table is used.

To summarize the above explanation concerning the concept of the present invention, the following relationship exists between the subsets $M(P_i, D)$ and $M(\overline{P}_i, D)$ of the quotient set X, $$M(P_i, D) \neq N[M(\overline{P}_i, D)]$$

$$M(P_i, D) \cap N[M(\overline{P}_i, D)] = M'(P_i, D) \neq \phi$$

and, $$M'(P_i, D) < M(P_i, D)$$

$$M'(P_i, D) < N[M(\overline{P}_i, D)]$$

Therefore, when $M'(P_i, D) \ni a$, it follows that $$M(P_i, D) \ni a$$

$$N[M(\overline{P}_i, D)] \ni a,$$

that is, $$M(\overline{P}_i, D) \ni -a$$

Thus, elements of the subsets $M(P_i, D)$, $M(\overline{P}_i, D)$ can be obtained by providing one table of $M'(P_i, D)$.

FIG. 7 is a table in which the relationship between $P_i$, D, and $m_i$ is obtained by using the above principle. In FIG. 7, $m_i$ is 4 bits, $P_i$ is 5 bits without a sign and D is 9 bits (however, it is normalized so that the most significant bit is "1"), and several discontinuous points exist therebetween. However, it is known that a comparatively continuous relationship exists, that is, when D increases, $m_i$ decreases.

As mentioned above, the process for determining $m_i$ logically corresponds to retrieval from a table addressed by $P_i$ and D to determine the value of $m_i$. When $P_i$ is 6 bits including the sign, a table must be formed having 64 entries × 256 entries, and this is not practical. Therefore, it is considered that the construction of a table addressed by $P_i$, $m_i$ with a range of D for the elements shown in FIG. 6 is the most efficient.

In the table shown in FIG. 7, the upper 5 bits of $P_i$ are designated as a hexadecimal number, the 4 bits of $m_i$ are designated as a hexadecimal number, and the upper 9 bits (wherein the most significant bit is "1") of D are designated as a hexadecimal number. The upper 9 bits of D designates a lower limit value for the elements entry.

Therefore, when the elements of the table are $T_{Pi, mi}$ the range of D which satisfies the following relationship $M'(P_i, D) \ni m_i$ is determined by the following:

$$T_{Pi, mi} \leq D \leq (T_{Pi, mi-1}) - 1$$

As a concrete example, when $P_i = '001011'$ is designated as a hexadecimal number without a sign, it becomes a '0B'(H), and similarly, D = '110000000' becomes '180'(H). Therefore, in the table, as $$T'0B', 8 \leq D \leq (T'0B', 7) - 1$$

(indicated by box)
and referring to the following relationship $$160_H \leq 180_H \leq 18F_H$$

it can be seen that the value to be determined is '8'.
When the following relationship is given $$P_i = (P_i)_b '110100'$$

the sign is negative, so that '001011' is obtained as the complement of $(P_i)_b$. Therefore, "0B'" excepting the sign can be designated as a hexadecimal number, and the entry is the same as mentioned above, and thus $m_i = 8$ is obtained. Finally, the sign is adjusted, and '−8' is obtained as a true predicting partial quotient.

FIG. 8A shows one example of the function of the usual decoder (DEC) 11 shown in FIG. 5 and FIG. 8B shows the function of the modified decoder (MDEC) 111 shown in FIG. 5. Examples of the operation of the invention by which the partial quotient predicting signal m is output will be given for output data of the adder 51 [that is, the upper digit of $PR_i + mDSR$] which is first positive and then negative.

EXAMPLE 1

When the output data of the adder 51 is '00100' the sign bit of the data is "0" (positive). In this case, first assume that a carry is not produced by the carry predicting circuit 521. The output of the decoder 11 [that is the decoded output which places the line 4 (see FIG. 8A) in an ON state, as indicated by 1 in FIG. 8A] is supplied to the partial quotient predicting circuit 3 which will be selected by the selector 12. When the obtained partial quotient predicting signal has a carry, i.e., the carry predicting circuit 521 outputs a "1", and it is predicted that the above-mentioned data will become '00101', the selector 12 exerts a control due to the carry from the carry predicting circuit 521 so that the partial quotient predicting circuit 31 is selected. In this case, the output of the modified decoder circuit 111 for the input '00100' including the sign [as indicated by 2 in FIG. 8B, that is, the output which places the line 5 (see FIG. 8B) in an ON state] is supplied to the partial quotient predicting circuit 31. Thus, the correct partial quotient predicting signal m is obtained.

EXAMPLE 2

When the output data of the adder 51 is '11011', the sign bit of the data is "1" (negative). Therefore, according to the logic disclosed in the prior Japanese Unexamined Application No. 59-070353, the output of the adder 51, that is the "ones" complement output of complement generator 10, is supplied to the decoder circuits 11 and 111, and the absolute value of the partial quotient predicting signal m is output.

Therefore, in this case, if no carry from the carry predicting circuit 521 exists, the "ones" complement of the data '1011' excluding the sign, is '0100'. Then the output [as indicated by 1 in FIG. 8A, that is the decoded output which places the line 4 to an ON state] of the decoder 11 corresponding to the complemental output is supplied to the partial quotient predicting circuit 3. When the output of the partial quotient predicting circuit 3 includes a carry, the original data becomes '11100' and then it is predicted that the complemental output will be '0011'. Then the selector 12 exerts control due to the carry from the carry predicting circuit 521 so that the output of the partial quotient predicting circuit 31 is selected since the input '10100' including the sign [as indicated by 3 in FIG. 8B, that is, the input which places the line 3 in an ON state] is supplied to the modified decoder 111 and the input partial quotient predicting signal is supplied to the partial quotient predicting circuit 31. Thus, the correct partial quotient predicting signal m is obtained, i.e., the same value of m as the partial quotient predicting circuit 3 would produce for the input '0011'.

As mentioned above, the characteristic feature is that, the modified decoder 111 forms the decode signal predicting +1 when the sign bit of the adder 51 is "0" (positive), and forms the decode signal predicting −1 when the sign bit thereof is "1" (negative).

FIGS. 9A and 9B are tables illustrating an alternative to the example shown in FIG. 7.

In the table shown in FIG. 4, the CPAO is 6 bits (64 entries), the obtained m is 5 bits including the sign (32 entries), and the radix is 16. However, when m is 4 bitss including the sign (expressed by ml), with reference to the equations on the bottom of page 7 $\delta = (\frac{1}{2})^5$ [that is, the table is formed by inputting the upper 6 bits (DSR1) of the DSR], $\epsilon = 2$ [the CPA is 4 bits (CPA1) including the sign] and a table which like the table shown in FIG. 4, satisfies CONDITION I (above) can be obtained. This can be used as table a rough portion of the quotient predicting table and as illustrated in FIG. 9A.

Comparing the tables shown in FIG. 9A and as shown in FIG. 4, the following relationship is apparent. When the portion corresponding to an odd number m in the precise portion of the partial quotient predicting table shown in FIG. 4 is "1", an even number ml which is smaller by "1" than the number m in the table shown in FIG. 4 will be obtained in the table shown in FIG. 9A. Therefore, for the purpose of correcting the error caused by using the table in FIG. 9A, when "1" exists in the portion for the odd number m in the table shown in FIG. 4, the precise m can be obtained from the table in FIG. 9A by storing information in a correcting table and by referring to the same. FIG. 9B is a table which schematically shows such a correcting table.

Hereinafter, the correcting method will be concretely explained. First, referring to row CPA1 = −30 in the rough portion of the quotient predicting table in FIG. 9A, for example, if $$L'-30, -14=1$$

and, in the correcting table (FIG. 9B), the corresponding entry (that is, for CPA2 = −30) is $$L''-30=1$$

than a correction operation is carried out to obtain the value corresponding to the odd number m (that is, so m = −13), that
ti $L'-30, -13=1$.

On the other hand, a correction value of $$L''-30=0$$

shows that "1" does not exist at any portion for the odd number m for CPA0 = −30. Therefore, in the rough portion of the quotient predicting table, for example, $$L'-30, -14=1$$

is used as it stands as the precise portion of quotient predicting table.

Further, when in one column in CPA1 = −30 in the rough portion of the quotient predicting table, for example, $$L'-30, -14=1$$

and for CPA2 = −29 in the correcting table, $$L''-29=1,$$

the correction is carried out to the value corresponding to the odd number m (i.e., corresponding to m = −13), that is $$L'-29, -13=1.$$

That is, when $L''+ = 1$ in the correcting table, it shows that, in the column corresponding to CPA0 = −30 in the precise portion of quotient predicting table shown in FIG. 4, one "1" exists at any portion for the odd number m. This is retrieved from the rough portion of the quotient predicting table shown in FIG. 9A, and when as mentioned above, $$L'-30, -14=1$$

it is determined that $$L'-30, -13=1.$$

This is a key feature of the present invention. Therefore, $$L'-30, -12=1$$

becomes

L'−30, −11=1 and similar operations are performed for all values of ml whn CPA1=−30.

The above-mentioned correcting table is formed by the above-mentioned condition, and each element thereof is expressed by the following equation:

$$L''cpa2, m2(DSR2) = \Sigma Lcpa2, 2i+1(DSR2) = 1$$

where $\Sigma$ shows the logical sum from $i=-8$ to $i=+7$, cpa2 is the upper 6 bits including the sign in the output of the carry propagate adder, and DSR2 is the upper 9 bits of the dividend. The correcting table formed by equation is shown in FIG. 9B.

According to the present invention, the same function as shown in the precise portion the quotient predicting table shown in FIG. 4 can be realized by the rough portion of the quotient predicting table shown in FIG. 9A and the correcting table shown in FIG. 9B, so that it can be recognized that the amount of hardware needed is decreased.

In the explanation above, CPA and m are used to address the partial quotient predicting table, however, m can be set to the value coded by using a plurality of desired values from −16 to +15, to form an effective signal in the subsequent process.

What is claimed is:

1. A divider apparatus, comprising:
   a divisor register for storing a divisor having upper digits;
   a partial remainder register, having a content separated into upper and lower digits, for initially storing a dividend and subsequently storing a partial remainder;
   a multiplier, operatively connected to receive the divisor from said divisor register, for multiplying the divisor by a predicted quotient to produce an output separated into upper and lower digits;
   a first adder, operatively connected to said partial remainder register and said multiplier, for subtracting the output of said multiplier from the content of said partial remainder register, thereby calculating the partial remainder in a cycle which is repeated to carry out the division;
   a second adder, operatively connected to said multiplier and said partial remainder register, for producing an output indicating a difference between the upper digits of the output of said multiplier and the upper digits of the content of said partial remainder register;
   a first predictor means, operatively connected to said second adder and said divisor register, for predicting a partial quotient from the output of said second adder and the upper digits of the divisor;
   second predictor means, operatively connected to said second adder and said divisor register for correcting the output of said second adder to produce a corrected output and for predicting the partial quotient from the corrected output of said second adder and the upper digits of the divisor;
   carry predicting means, operatively connected to said first adder, for producing an output indicating a carry to be propagated to said second adder from the lower digits of the output from said multiplier and the lower digits of the content of said partial remainder register; and
   selector means, operatively connected to said first and second predictor means, said carry predicting means and said multiplier, for selecting one of the outputs of said first and second predictor means in dependence upon the output of said carry predicting means to produce the predicted quotient.

2. A divider apparatus according to claim 1,
   wherein said first and second predictor means output a positive partial quotient when the output of said second adder is positive, and a negative partial quotient when the output of said second adder is negative, and
   wherein said divider apparatus further comprises a quotient correcting circuit, operatively connected to said selector means and said partial remainder register, for correcting the predicted quotient in dependence upon the sign of the partial remainder formed by the partial quotient thereby determining a true quotient.

3. A divider apparatus according to claim 2,
   further comprising a complementing circuit, operatively connected to said second adder and said first and second predictor means, for supplying the output of said second adder without changes when the output of said second adder has a first polarity and for supplying as an output a complement of the output of said second adder when the output of said second adder has a second polarity, opposite to the first polarity,
   wherein said first predictor means comprises a first predictor circuit, operatively connected to said complementing circuit and said selector means, for determining the partial quotient from the output of said complementing circuit and the upper digits of the divisor, and
   wherein said second predictor means comprises a second predictor circuit, operatively connected to said complementing circuit, said second adder and said selector means, for compensating the partial quotient by the sign of the output of said second adder.

4. A divider apparatus according to claim 3, wherein said first predictor circuit comprises:
   means for outputting partial bits of the partial quotient by using partial bits of the output of said complementing circuit; and
   means for outputting remaining bits of the partial quotient by using all of the bits of the output of said complementing circuit.

5. A divider apparatus according to claim 2, wherein each of said first and second predictor means comprises:
   means for outputting partial bits of the partial quotient by using partial bits of the output of said second adder; and
   means for outputting remaining bits of the partial quotient by using all of the bits of the output of said second adder.

6. A divider circuit according to claim 1, 2, 3, 4 or 5, wherein said multiplier comprises:
   a shift circuit, operatively connected to said divisor register for multiplying the divisor by positive and negative whole number powers of two;
   means, operatively connected to said selector means and said shift circuits, for selecting a combination of the positive and negative whole number powers of two in accordance with the partial quotient; and
   an adder, operatively connected to said shift circuit and said first and second predictor means for adding the selected combination.

7. An apparatus for dividing a dividend by a divisor having upper digits, said apparatus comprising:
- a partial remainder register for storing a partial remainder, for receiving the dividend as an initial partial remainder and for supplying upper and lower digits of the partial remainder;
- multiplier means, for multiplying the divisor by a selected predicted partial quotient to produce a divisor multiple having upper and lower digits;
- adder means for determining differences between the upper digits of the divisor multiple and the upper digits of the partial remainder to produce a first result having a sign and for determining differences beween the lower digits of the divisor multiple and the lower digits of the partial remainder to produce a second result including a carry signal indicating when a carry will be produced as part of the second result and for combining the first and second results to produce a new partial remainder; and
- predictor means for generating a first predicted partial quotient from the upper digits of the divisor and the first result, for producing a corrected first result in dependence upon the sign of the first result, for producing a second predicted partial quotient from the upper digits of the divisor and the corrected first result and for selecting one of the first and second predicted partial quotients to be supplied as the selected predicted partial quotient to said multiplier means for multiplication with the divisor.

8. An apparatus according to claim 7, wherein said adder means comprises:
- a first adder circuit, operatively connected to said multiplier means, said partial remainder register and said predictor means, for determining the difference between the upper digits of the divisor multiple and the upper digits of the partial remainder to produce the first result;
- a second adder circuit, operatively connected to said multiplier means and said partial remainder register, for determining the difference between the lower digits of the divisor multiple and the lower digits of the partial remainder to produce a portion of the second result excluding the carry signal;
- a carry predicting circuit, operatively connected to said second adder circuit and said predictor means, for producing the carry signal; and
- means for combining the first and second result to form the new partial remainder.

9. An apparatus for dividing a dividend by a divisor having upper digits, said apparatus comprising:
- a partial remainder register for storing a partial remainder, for receiving the dividend as an initial partial remainder and for supplying upper and lower digits of the partial remainder;
- multiplier circuits, operatively connected to receive the divisor, for multiplying the divisor by selected positive and negative powers of two in dependence upon a predicted partial quotient to produce products;
- product registers, each operatively connected to a corresponding one of said multiplier circuits, for storing the products;
- a first carry/save adder circuit, operatively connected to said product registers, for adding the products to produce first carry and sum signals;
- a second carry/save adder circuit, operatively connected to said first carry/save adder circuit and said partial remainder register, for adding the first carry and sum signals and the partial remainder to produce second carry and sum signals;
- a carry propagation adder circuit, operatively connected to said second carry/save adder circuit and said partial remainder register, for adding the second carry and sum signals to produce a third carry signal and a new partial remainder; and
- predictor means for generating the predicted partial quotient in dependence upon the second and third carry signals and the second sum signal.

10. An apparatus according to claim 7, wherein said predictor means comprises:
- first predictor means, operatively connected to said adder means, for producing the first predicted partial quotient from the upper digits of the divisor and the first result by assuming that the carry signal will not indicate a carry;
- second predictor means, operatively connected to said adder means, for producing the corrected first result by assuming that the carry signal will indicate a carry and for producing the second predicted partial quotient from the upper digits of the divisor and the corrected first result; and
- selector means, operatively connected to said first and second predictor means, said adder means and said multiplier means, for selecting the first predicted partial quotient when the carry signal does not indicate a carry and for selecting the second predicted partial quotient when the carry signal indicates a carry.

11. An apparatus according to claim 10, wherein said predictor means further comprises a complement generator, operatively connected to said adder means, for generating a complement of the first result when the sign of the first result is negative,
wherein siad first predictor means, comprises:
- a first decoder, operatively connected to said complement generator, for decoding the first result excluding the sign; and
- a first predictor circuit, operatively connected to said first decoder and said selector, for generating the first predicted partial quotient, and wherein said second predictor means comprises:
- a second decoder, operatively connected to said complement generator, for decoding the first results including the sign; and
- a second predictor circuit, operatively connected to said second decoder and said selector, for generating the second predicted partial quotient.

12. An apparatus according to claim 10, wherein the first result is a binary number having a least significant bit and wherein said first and second predictor means respectively determine the first and second predicted partial quotients by assuming that the least significant bit equals zero to determine a value and then adjusting the value if the least significant bit equals one.

13. An apparatus according to claim 7, wherein the first result is a binary number having a least significant bit and wherein said predictor means generates the first and second predicted partial quotients by assuming that the least significant bit equals zero to determine a value and then adjusting the value if the least significant bit equals one.

* * * * *

UNITED STATES PATENT AND TRADEMARK OFFICE
CERTIFICATE OF CORRECTION

PATENT NO. : 4,722,069

DATED : January 26, 1988

INVENTOR(S) : Ikeda

It is certified that error appears in the above-identified patent and that said Letters Patent is hereby corrected as shown below:

Col. 1, line 22, "=" should be -- - --.

line 29, no paragraph; "1" should be --$\ell$--;

line 33, "r=2$^{1/m}$" should be --r=2$^{\ell/m}$--;

lines 45 and 50, "division" should be --divisor--.

Col. 4, line 5, "-X" should be -- -1X--;

line 10, after "(-15DSR" insert -- $\sim$+15DSR--;

line 21, "hexacecimal" should be --hexadecimal--;

line 22, before "..." insert --$D_{-2}$--;

line 39, "by the" should be --as a--;

line 47, delete ","; move "the value will be" to after "(hereinafter";

line 57, "," should be --:--;

line 65, "-D<$P_n$Xm+D<D" should be -- -D<$P_n$+mxD<D--

UNITED STATES PATENT AND TRADEMARK OFFICE
CERTIFICATE OF CORRECTION

PATENT NO. : 4,722,069

DATED : January 26, 1988

INVENTOR(S) : Ikeda

Page 2 of 4

It is certified that error appears in the above-identified patent and that said Letters Patent is hereby corrected as shown below:

Col. 6, line 23, "(AP1)" should be --QP1)--;

line 35, "+" should be --±-- (all occurrences);

Col. 7, line 4, delete "which";

line 12, "=pi" should be -- =$P_i$--;

line 16, "pi" should be --$P_i$--;

line 22, "an" should be --the--;

line 24, "the" should be --an--;

line 25, "pi" should be --$P_i$--;

line 33, "Pi" should be --$P_i$--;

line 41, "," (1st occurrence) should be --and--;

line 44, "[[" should be --[--;

line 61, "M($\overline{P}_i$,D)" should be --M($P_i$,D)--;

line 62, "N[M($P_i$,D)]" should be --N[M($\overline{P}_i$,D)]--; and "commmon" should be --common--.

UNITED STATES PATENT AND TRADEMARK OFFICE
CERTIFICATE OF CORRECTION

PATENT NO. : 4,722,069

DATED : January 26, 1988

INVENTOR(S) : Ikeda

Page 3 of 4

It is certified that error appears in the above-identified patent and that said Letters Patent is hereby corrected as shown below:

Col. 8, line 26, "requirement" should be --requirements--;

lines 41, 46 & 54, "$P_i$" should be --$\overline{P}_i$--;

line 57, "$P_i$ should be --pi--, and "=001011"" should be --"001011"--.

Col. 9, line 16, "$(P_i)b$" should be --$\overline{(P_i)b}$--;

lines 20 & 33, "$(P_i,D)$" should be --$(\overline{P}_i,D)$--.

Col. 11, line 32, after "selected" insert --,--;

line 48, should not begin a new paragraph;

line 50, "bitss" should be --bits--;

line 55, after "which" insert --,--;

line 57, "can be used as table" should be --table can be used as--;

lines 59 & 60, delete "as shown";

line 66, "the error" should be --errors--.

UNITED STATES PATENT AND TRADEMARK OFFICE
CERTIFICATE OF CORRECTION

PATENT NO. : 4,722,069

DATED : January 26, 1988

INVENTOR(S) : Ikeda

It is certified that error appears in the above-identified patent and that said Letters Patent is hereby corrected as shown below:

Col. 12, line 17, "than" should be --then--;

line 18, delete "is, so";

line 19, after "," insert --so--;

line 20, delete "ti";

line 49, "+" should be -- -30--.

Col. 13, line 4, "whn" should be --when--;

line 14, before "equation" insert --this--.

Signed and Sealed this

Nineteenth Day of July, 1988

Attest:

DONALD J. QUIGG

Attesting Officer         Commissioner of Patents and Trademarks